United States Patent [19]

Byron

[11] Patent Number: 5,652,818
[45] Date of Patent: Jul. 29, 1997

[54] BRAGG GRATINGS IN WAVEGUIDES AND METHOD OF MAKING SAME

[75] Inventor: Kevin Christopher Byron, Bishop's Stortford, United Kingdom

[73] Assignee: Northern Telecom Limited, Montreal, Canada

[21] Appl. No.: 667,093

[22] Filed: Jun. 20, 1996

[30] Foreign Application Priority Data

Jun. 20, 1995 [GB] United Kingdom .................. 9512548

[51] Int. Cl.$^6$ .................. G02B 6/34; G02B 5/18
[52] U.S. Cl. .................. 385/37; 385/123; 359/558; 359/569
[58] Field of Search .................. 385/31, 37, 27, 385/123, 124, 147, 10; 359/558, 563, 569, 566, 570

[56] References Cited

U.S. PATENT DOCUMENTS

| | | | |
|---|---|---|---|
| 5,066,133 | 11/1991 | Brienza | 385/37 X |
| 5,104,209 | 4/1992 | Hill et al. | 385/27 |
| 5,327,515 | 7/1994 | Anderson et al. | 385/123 |
| 5,367,588 | 11/1994 | Hill et al. | 385/37 |
| 5,377,288 | 12/1994 | Kashyap et al. | 385/37 |
| 5,430,817 | 7/1995 | Vengsarkar | 385/37 |

*Primary Examiner*—Brian Healy
*Attorney, Agent, or Firm*—Lee, Mann, Smith, McWilliams, Sweeney & Ohlson

[57] ABSTRACT

A method of generating a Bragg reflective grating in a photosensitive optical waveguide using a fringe pattern of electromagnetic radiation involves positioning a mask in the path of the radiation, and moving that mask during the creation of the grating so that different portions of the grating receive different exposures to the radiation so that the resulting grating, though it has a constant physical pitch, has an effective optical pitch that is a function of position along the length of the grating.

5 Claims, 1 Drawing Sheet

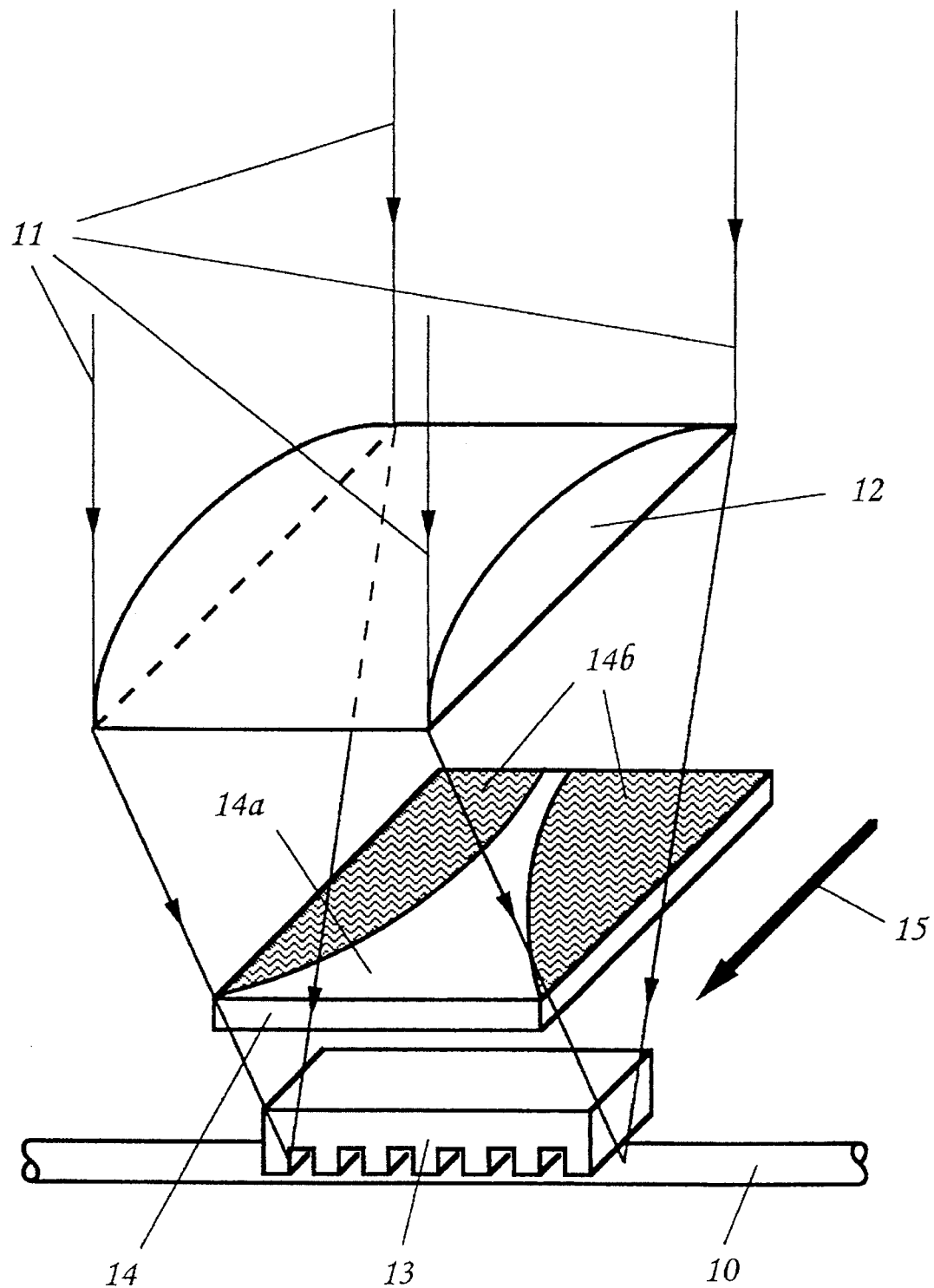

BRAGG GRATINGS IN WAVEGUIDES AND METHOD OF MAKING SAME

BACKGROUND OF THE INVENTION

This invention relates to the creation of Bragg reflective gratings in photosensitive optical waveguide, and in particular to the creation of such gratings in forms exhibiting chirp or apodisation.

A method of providing such shading, chirp or apodisation is described by H. N. Rourke et al in a paper entitled 'Fabrication and Characterisation of Long, Narrow-Band Fibre Gratings by Phase Mask Scanning', Electronics Letters (4 Aug. 1994) Vol. 30, No. 16 pp 1341–2. In that instance the Bragg grating is created in an optical fibre by lateral exposure of the fibre to ultra-violet light through a phase grating mask. The ultra violet light is scanned across the mask in the axial direction of the fibre, and it is explained that, by appropriate programming of the speed of the scan, the exposure time can be tailored to a particular function of position along the length of the developed Bragg grating.

SUMMARY OF THE INVENTION

The present invention is directed to an alternative method of pitch tailoring, in particular a method that is easy to align and can be employed both in the creation of Bragg gratings generated by two-beam holography and those generated with the aid of phase grating masks. Furthermore it is a method that has the flexibility that different tailorings can be produced without changing the two-beam holography or phase mask set up.

According to the present invention there is provided a method of creating a Bragg reflection grating in a length of photosensitive optical waveguide by lateral illumination of the waveguide with a fringe pattern of electromagnetic radiation through a mask moving transversely relative the waveguide which mask is provided with at least one window the configuration of which is a function of position along the direction of said transverse relative movement.

BRIEF DESCRIPTION OF THE DRAWING

There follows a description of the creation of a Bragg reflective grating in a length of photosensitive optical fibre by a method embodying the invention in a preferred form.

The description refers to the accompanying drawing which is a schematic perspective view of the apparatus employed to create the grating.

DETAILED DESCRIPTION OF PREFERRED EMBODIMENT

To form a Bragg reflective grating in a length of photosensitive optical fibre waveguide 10, a collimated beam of ultra-violet light 11 for instance from a frequency doubled argon ion laser, (not shown), is incident upon a cylindrical lens 12 which focuses the light into a line extending substantially along the axis of the fibre 10. Adjacent the fibre 10 is a phase grating 13 which interacts with the incident light to form a fringe pattern of light in the optical core of the optical fibre 10. If desired, the spacing of the phase grating from the fibre may be modulated during the creation of the Bragg grating after the manner described in the specification of patent application No. 9410545.9.

Adjacent the phase mask, and in the path of the incident light, is a mask 14 having portions 14a and 14b that are respectively transmissive and non-transmissive to the incident light of beam 11.

During the creation of the Bragg grating in the fibre 10 the mask is moving relative the fibre in a transverse direction as indicated by arrow 15. The configuration of the transmissive window 14a of the mask 14 is a function of position along the direction of relative movement, and so different portions along the length of the Bragg grating receive a different fluence levels of the light of beam 11. Those portions that receive relatively more fluence suffer a greater refractive index change than those portions that receive relatively less fluence, and therefore, although all portions have the same physical grating pitch, different portions have different effective optical pitch (by which teem is meant the product of the physical pitch with the effective refractive index of the waveguide at that location).

Though the foregoing specific description has related to Bragg grating creation using a phase mask, it should be understood that the invention is applicable also to Bragg grating creation using two-beam holography to generate the requisite fringe pattern. Furthermore, by varying the rate of traverse, different shading functions can be obtained for the same mask since the actual apodisation is a convolution of the incident light power and the time of exposure.

I claim:

1. A method of creating a Bragg reflection grating in a length of photosensitive optical waveguide by lateral illumination of the waveguide with a fringe pattern of electromagnetic radiation through a window in a mask moving transversely relative the waveguide, which window is configured such that said transverse relative movement changes the magnitude of the length of the waveguide illuminated through said window.

2. A method as claimed in claim 1, wherein the optical waveguide is an optical fibre waveguide.

3. A method as claimed in claim 1, wherein the direction of said transverse relative movement is substantially at right angles to the direction of extent of the optical waveguide in the region of Bragg grating creation.

4. A length of photosensitive optical waveguide in which a Bragg reflection grating has been created by the method claimed in claim 1.

5. A length of optical waveguide as claimed in claim 4, which optical waveguide is an optical fibre waveguide.

* * * * *